INVENTOR
ROBERT WILLIAM YOUNG
BY Young & Thompson
ATTYS.

INVENTOR
ROBERT WILLIAM YOUNG
By Young & Thompson
ATTYS.

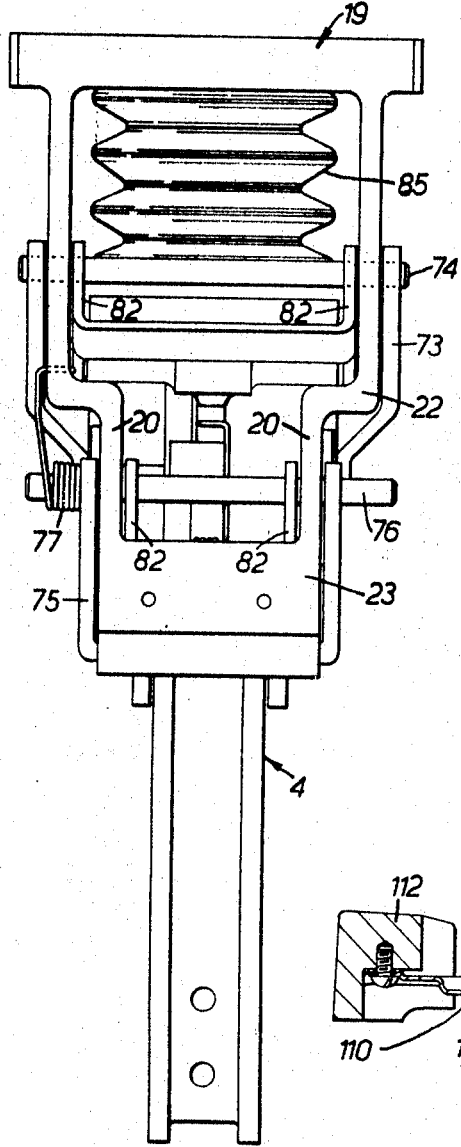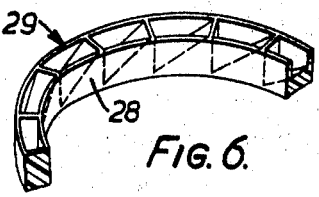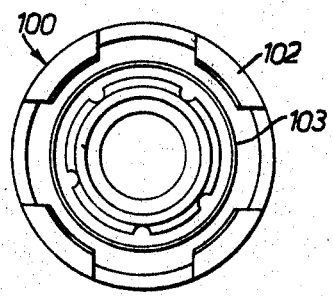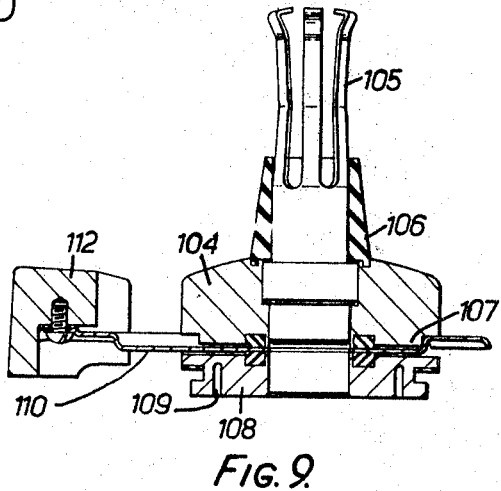

United States Patent Office
3,460,723
Patented Aug. 12, 1969

1

3,460,723
LIQUID MEASURES
Robert William Young, Battledown, England, assignor to Autic Developments Limited, Cheltenham, England
Filed Aug. 24, 1967, Ser. No. 662,938
Claims priority, application Great Britain, Aug. 24, 1966, 37,921/66
Int. Cl. G01f 11/28
U.S. Cl. 222—453                18 Claims

ABSTRACT OF THE DISCLOSURE

A liquid measure having a measuring chamber, a normally open inlet port and a normally closed outlet port for the chamber, with the ports being alternatively closable by a common shuttle valve member. A dispensing member is operable to change over the valve member and dispense the measured quantity of liquid contained in the chamber, and an interlock mechanism is provided which includes a time delay device in the form of a bellows and is operative to prevent reverse change over of the valve member after a dispensing operation until an adequate delay has elapsed for the chamber to drain completely and to prevent another operative movement of the dispensing member with attendant change-over of the valve member until a further delay has elapsed to allow the chamber to refill.

---

Figure 1:
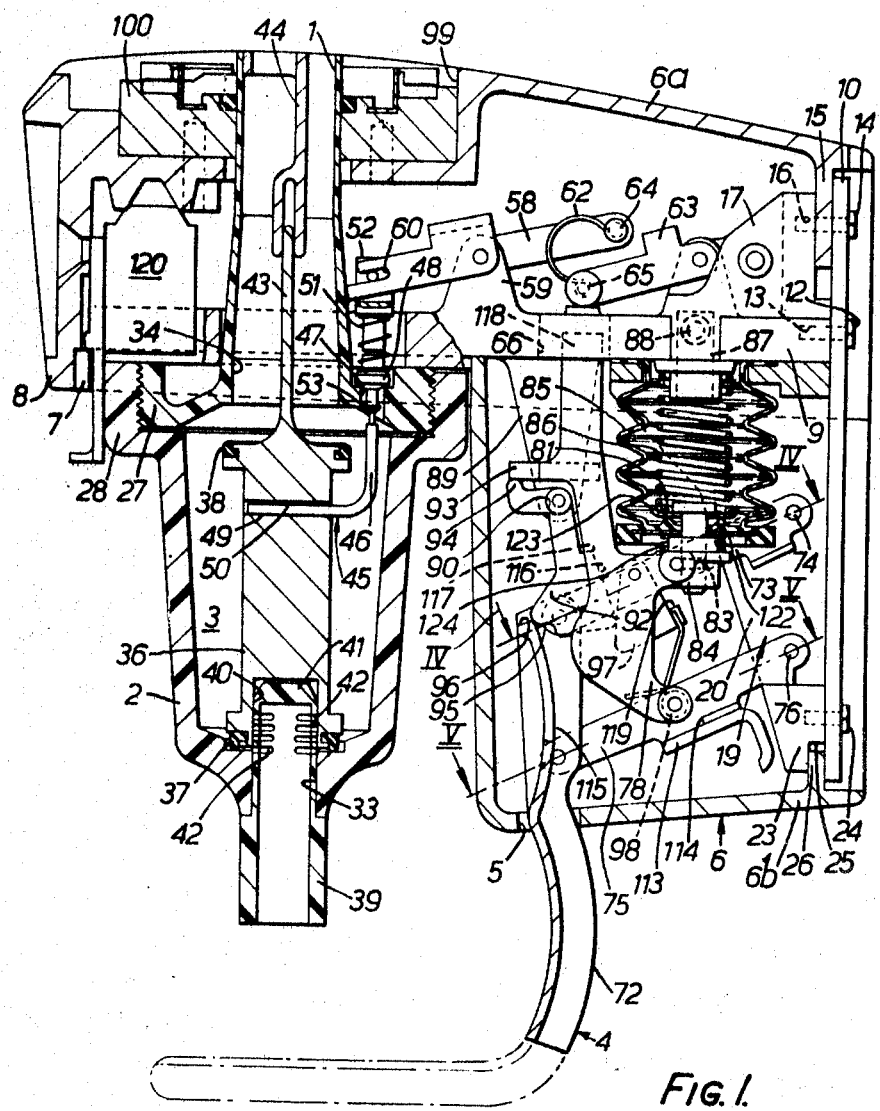

This invention relates to liquid measures of the type which operate to dispense a metered and predetermined volume of liquid as required. Measures of this type are commonly used to disperse spirits and the like direct into a drinking glass, such a measure then being designed for fitting directly on to the neck of an inverted bottle.

With spirit measures at present in use it is possible for a barman to cheat by dispensing short measure, and it is an object of the invention to provide a liquid measure which is particularly suitable for use with spirits and with which it is not possible to dispense under or over measure, either accidentally or willfully.

According to the invention a liquid measure has a measuring chamber, a normally open inlet valve and a normally closed outlet valve for the chamber, a dispensing member which is operable to change over the valves and dispense the measured quantity of liquid contained in the chamber, and an interlock mechanism which includes a time delay device and is operative to prevent reverse change over of the valves after a dispensing operation until an adequate delay has elapsed for the chamber to drain completely and to prevent another operative movement of the dispensing member with attendant change-over of the valves until a further delay has elapsed adequate to allow the chamber to refill.

Preferably the time delay device is pneumatic in operation and incorporates a bellows with spring aided return movement which induces air at a controlled rate through an adjustable restrictor valve which enables that rate and hence the time delay to be adjusted. Alternatively an electric, clockwork or any other suitably adaptable form of time delay device may be employed.

The inlet and outlet valves of the chamber may utilise a common shuttle valve member which is changed over by a toggle mechanism employing an over-centre spring, operation of the valve member being by way of an operating linkage associated with the interlock mechanism. The dispensing member is preferably arranged so that it can be engaged and displaced by a glass to be filled as the latter is positioned below a drain outlet of the chamber, and it is conveniently arranged to be vertically movable by the rim of the glass when directly below the outlet.

Figure 2:
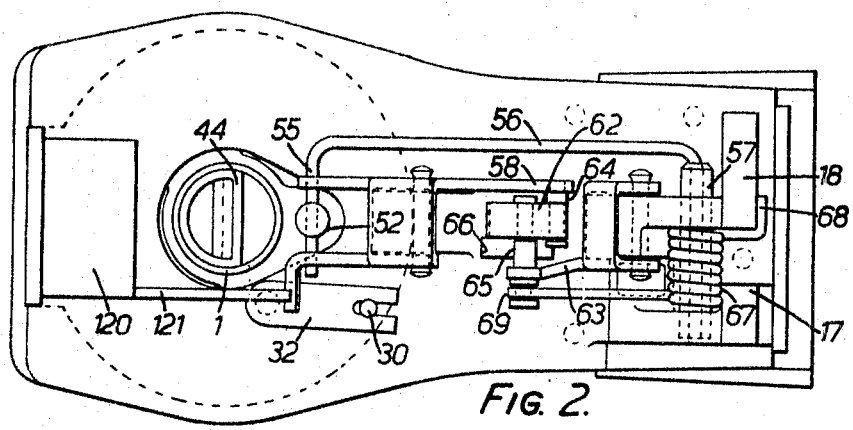
Figure 4:
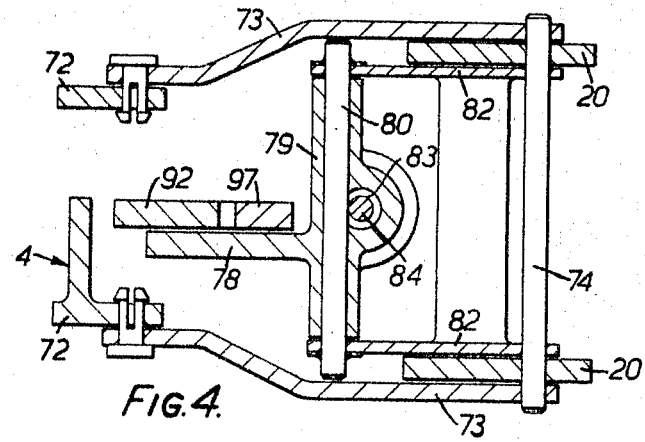
Figure 5:
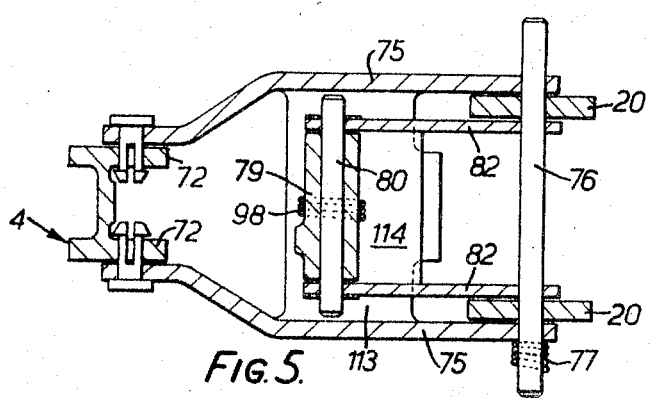
Figure 7:
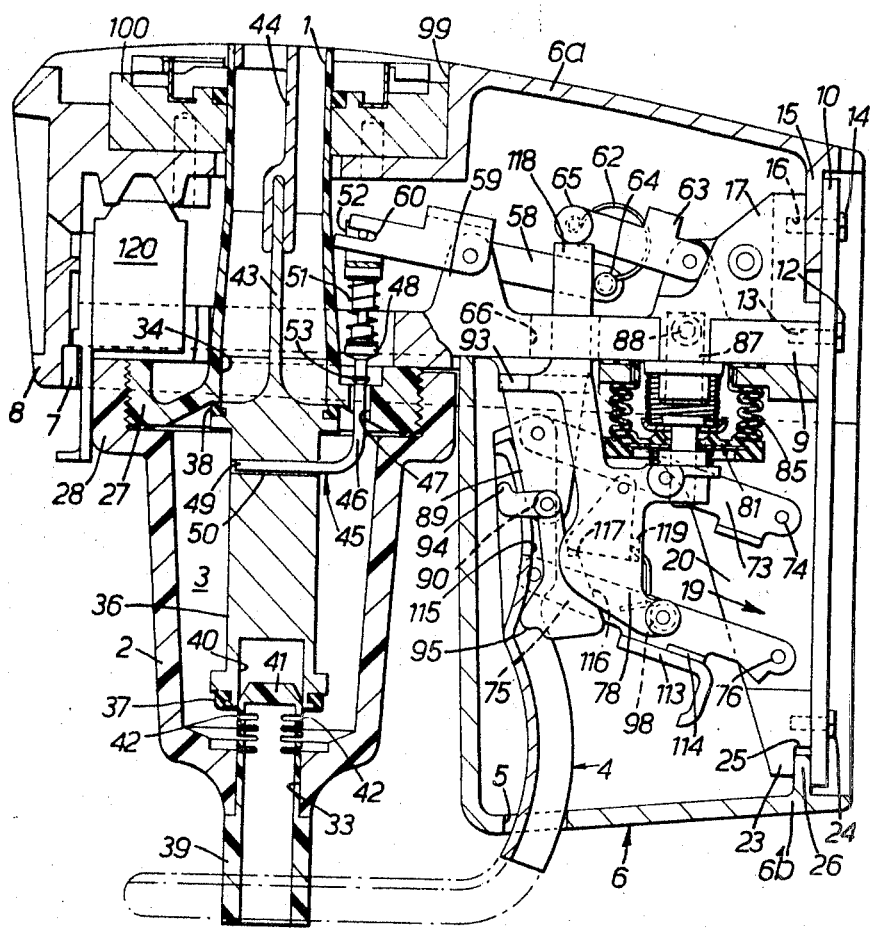

The invention will now be further described with reference to the accompanying drawings which show, by way of example, a spirit measure in accordance with the invention and comprising a dispensing section for attachment to a bracket or a convenient vertical surface and a mounting section for attachment to the neck of a bottle. In the drawings:

FIGURE 1 is a side view of the dispensing section in a normal inoperative position, part of the figure being in vertical section and the remainder having an outer housing cut away to show internal detail, FIGURE 2 is a plan view of the dispensing section with an upper housing portion removed, FIGURE 3 is a rear view of a sub-assembly of the dispensing section, FIGURES 4 and 5 are respectively sectional views on the lines IV—IV and V—V of FIGURE 1, FIGURE 6 is a fragmentary view of part of the dispensing section, FIGURE 7 is a view similar to that of FIGURE 1, but showing the movable parts of the dispensing section in the position they occupy when spirit first starts to flow from the measure, FIGURE 8 is a plan view of the bayonet-type attachment ring of the dispensing section for securing the latter to the mounting section, and FIGURE 9 is a sectional view of the mounting section.

The dispensing section has a feed tube 1 for the supply of spirit to a transparent container 2 enclosing a normally-filled measuring chamber 3 which successively empties and refills with each operative vertical movement of a dispensing member 4 projecting through an aperture 5 in the surrounding housing 6. The housing is in two portions, namely an upper and larger portion 6a through one end of which the feed tube 1 passes, and a lower portion 6b from which the dispensing member 4 projects and which has a peripheral rim 7 externally overlapped by a corresponding flange 8 on the upper portion 6a.

The housing 6 encloses a horizontal plate-like casting 9 one end of which is connected to a vertical backplate 10 by means of securing screws 12 passed through holes in the plate 10 and threaded into tapped bores 13 in the casting 9. Securing screws 14 are passed through aligned holes in the backplate 10 and through a web 15 of the upper housing portion 6a and are screwed into tapped bore 16 formed in spaced blocks 17 and 18 formed on the upper surface of the casting 9. The under-surface of the casting 9 is secured to a bracket 19 having laterally spaced flanges 20 which, towards their lower ends, are cranked inwardly at 22 (FIGURE 3) and interconnected by a plate-like portion 23 connected to the backplate 10 by connecting screws 24. The lower edge of the plate-like portion 23 is cut away at 25 to receive an upstanding rib 26 formed on the internal lower surface of the lower housing portion 6b. It will be appreciated that when the dispensing section is mounted the screws 12, 14 and 24 are not accessible so that the housing portions 6a and 6b cannot be detached, rendering the measure substantially tamper proof.

An externally threaded flange 27 is integrally moulded with the feed tube 1 from a suitable plastics material. The flange 27 is secured to the underside of the casting 9 and is externally threaded for engagement with a corresponding internally threaded rim 28 of the container 2 which is also moulded from a plastics material. As shown in FIGURE 6, the upper surface of the rim 28 is moulded with a ratchet formation 29 which is engageable with a detent pin 30 mounted on a leaf spring 32 and projecting through the casting 9. When the container 2 is screwed on the flange 27, the pin 30 rides along the ratchet formation 29, but the spring loading of the pin 30 ensures that the container 2 cannot be unscrewed unless the leaf spring 32 is lifted to free the pin 30 which can only be done if the housing portion 6a is removed.

The container 2 has a bottom drain outlet port 33 beneath which a glass can be positioned for filling and an upper inlet port 34 is provided by a through-bore in the flange 27. The outlet and inlet ports 33 and 34 respectively are alternatively closable by a common shuttle valve member 36 which is movable between two positions: a lower position (as shown in FIGURE 1) in which a resilient lower sealing ring 37 of the valve member 36 seals the outlet port 33 and allows the chamber 3 to fill from the bottle, with a predetermined volume of spirit defined by the size of the container 2, through the now open inlet port 34, and an upper position (as shown in FIGURE 7) in which an upper resilient ring 38 seals the inlet port 34 and the previously measured volume of spirit drains through the open outlet port 33 into the glass. The port 33 is provided with a drain tube 39 moulded from a transparent plastics material and which passes in and through the base of the container 2, so as to project upwardly for a short distance into a lower end central blind bore 40 in the valve member 36. The drain tube 39 assists in guiding valve movement and is closed at its upper end 41 so that the valve member 36 cannot be displaced from below by inserting a member through the drain tube 39. The spirit flow passes through side apertures 42 in the tube 39.

The valve member 36 has an upwardly projecting stem 43 slidable within a blind bore in a recessed guide 44 secured within the feed tube 1. This arrangement also prevents the valve member 36 being lifted from above. As can be seen from FIGURE 2, the guide 44 acts as a flow divider, the spirit passing down the feed tube on one side of the guide 44 and the displaced air from the chamber 3 passing upwardly and into the inverted bottle on the other side of the feed tube 1.

Vertical movement of the valve member 36 is produced by an operating linkage including an L-shaped valve operating rod 45 with a vertical limb 46 which passes through a vertical vent bore 47 in the flange 27 and a closure member 48 for the bore 47 is slidable on the limb 46. The rod 45 also has a lower horizontal limb 49 which engages a cross bore 50 in the valve member 36. A spring 51 between an end block 52, to which the upper end of the rod 45 is attached, and the closure member 48 urges the latter, in the lower position of the valve member 36, to the closed position. In the upper position of the valve member 36, the closure member 48 is lifted clear of the bore 47 by a shoulder 53 so that air enters the chamber 3 as the latter empties.

One end limb 55 of a U-shaped rod 56 acting as a guide link passes through a bore in the block 52, and the opposite end limb of the rod 56 pivots in a bearing sleeve 57 extending between the brackets 17 and 18. A valve-operating lever 58 is pivotally mounted, at an intermediate point along its length, to an upstanding projection 59 formed on the casting 9. One end of the lever 58 has a slot 60 which engages the limb 55 and the other end is connected, by means of an over-centre leaf spring 62, to one end of a swinging link 63 the other end of which is pivotally mounted on the block 18. The spring 62 is connected between projecting pins 64 and 65 respectively on the lever 58 and the link 63, and the pin 65 is disposed directly above a rectangular aperture 66 in the casting 9.

The links 58 and 63, together with the overcentre spring 62, form a toggle linkage with a snap-over action which changes over the position of the valve member 36 between the upper and lower positions. This toggle linkage is urged to the position shown in FIGURE 1 by means of a return spring 67 in the form of a torsion spring one end 68 of which is anchored to the block 18 and the other end 69 of which engages the pin 65.

Operation of the measure is effected by an upward displacement of the dispensing member 4 which is of channel-section form and towards its upper end has its side limbs 72 cranked outwardly for respective pivotal connection about a common axis to corresponding ends of two spaced swinging links 73 the other ends of which are pivotally mounted on a bar 74 extending between the flanges 20. The dispensing member 4 thus effectively forms one element of a parallelogram linkage the stationary element of which is provided by the flanges 20. A torsion spring 77 urges the links 73 and, therefore, the dispensing member 4 to the normal lowered position shown in FIGURE 1. At its lower end the member 4 may have a stirrup extension, as shown in dotted lines in FIGURE 1, which is engaged by the rim of the glass to lift the member 4 as the glass is positioned below the drain tube 39.

An elongated interlock lever 78 is formed with two vertically spaced bosses 79 each of which forms a pivotal bearing for a corresponding one of two pivot rods 80 pivotally mounted between two spaced swinging links 82 pivotally mounted on the corresponding bar 74 or 76. The upper bar 80 engages one side of an annular recess 83 formed towards the lower end of a cylindrical stem 84 projecting from a bellows 85 mounted beneath the casting 9. The bellows 85 is urged to the expanded position shown in FIGURE 1 by an internal helical compression spring 86 and, during return movement towards the expanded position, the bellows 85 draws in air through a restrictor valve 87. The restrictor valve 87 has a threaded valve needle 88 which may be adjusted to control the degree of restriction of the valve 87 and, as a result, the rate of expansion of the bellows 85.

The under-surface of the casting 9 has two laterally spaced and downwardly projecting brackets 89 the lower ends of which are formed with aligned bearing bores 90 defining a pivot axis for a hanging link 92 which, as shown in FIGURE 4, is laterally displaced from the plane of the interlock lever 78. The lever 78 has a projecting lug 93 which extends between the brackets 89 and which, in the lower position of the lever 78, engages a tail 94 on the link 92 to move the latter to the position shown in FIGURE 1 in which a lower edge recess 95 is displaced from the upper edge 96 of the dispensing member 4. When the link 92 is hanging freely, i.e., when the lug 93 is not in contact with the tail 94, the recess 95 engages the top edge 96 of the dispensing member 4 to lock the latter against upward movement. A pawl 97 is pivotally mounted on the interlock lever 78 and is spring loaded in a clockwise direction, as seen in FIGURE 1, into engagement with the link 92 by a torsion spring 98 mounted on the lower boss 79.

The upper housing portion 6a is formed with a circular recess 99 which surrounds the upper part of the feed tube 1 and in which is secured the bayonet-type attachment ring 100 shown in plan view in FIGURE 8. The ring 100 has a castellated rim 102 and an annular key 103 the upper exposed edge of which is suitably profiled. The mounting section, which is shown in FIGURE 9, does not form an essential part of the present invention and hence will not be described in detail. This section comprises a top plate 104 with a stem 105 for insertion into the neck of the bottle and the base of which is surrounded by a resilient seal 106. The underside of the top plate 104 has an elongated rib 107 on either side of which are disposed two blind bores (not shown) for the respective reception of spring-loaded locking pins or wards each of which has a reduced diameter neck. Each pin passes into a corresponding aligned bore formed in an intermediate plate 108 and the bases of these bores break into an annular groove 109 into which the key 103 pases when the mounting section is attached to the ring 100 with a twisting motion in which the castellated rim 102 engages corresponding arcuate projections on the intermediate plate 108.

A slide 110 having a finger grip 112 at one end is disposed between the intermediate plate 108 and the top plate 104. The slide 110 has a flow aperture and is formed along each longer side edge with two spaced notches. The arrangement is such that when the mounting section is not attached to the dispensing section, the slide 110 closes the flow path through the mounting section and is not slidable to the open position because the side edge notches engage the normal-diameter portions of the locking pins. However, when the mounting section is attached to the ring 100 the key 103 in the latter passes into the annular slot 109 and engages the bases of the locking pins so that the latter are displaced to a position in which the reduced diameter neck portions thereof enable the slide 110 to be moved to the open position so that the spirit may pass through the flow aperture. Furthermore, the engagement of the slide with the locking pins ensures that the mounting section can only be detached from the dispensing section when the slide 110 is closed, thus preventing leakage from the bottle.

A normal dispensing operation and the purpose of the interlocking arrangement of the lever 78 with the link 92 will now be described, assuming that the chamber 3 is already filled with spirit and that the valve member 36 is in the lower outlet-closed position; the dispensing member 4 is in the lower position as shown in FIGURE 1 and the lug 93 is in engagement with the tail 94 so that the recess 95 is moved out of locking engagement with the upper edge 96 of the dispensing member 4. A glass is positioned beneath the drain tube 39 and the member 4 moved upwardly. The links 73 and 75 thus pivot upwardly and a web 113 extending between the links 75 engages a web 114 extending between the links 82 and causes the interlock lever 78 to move upwardly. During this upward movement the link 92 rides along a cam-like surface 115 on the member 4, and the pawl 97 moves up the adjacent edge 116 of the link 92 until it engages a step 117 in the latter.

The attendant upward pivotal movement of the links 73 causes the stem 84 to move upwardly to compress the bellows 85 against the action of the return spring 86. During compression of the bellows 85, air escapes from the latter through a valve 81. The upper end 118 of the interlock lever 87 moves upwardly through the aperture 66 for a certain free distance and then engages the pin 65 and moves the toggle linkage over-centre with a snap-over action so that the valve operating lever 58 moves to the position shown in FIGURE 7, causing the rod 45 to move upwardly and to displace the valve member 36 from the lower to the upper position in which the upper sealing ring 38 seals against the lower end of the feed tube 1. The spirit previously in the measuring chamber 3 thus drains into the glass through the now open outlet port 33, air entering the chamber 3 through the bore 47.

The over-centre spring 62 ensures that the valve member 36 is always in either the upper or the lower closed position to prevent leakage of spirit if the dispensing member 4 is raised slowly in an attempt to dispense more or less than the correct volume. When the dispensing member 4 is released it is returned to the lower position by the spring 77, and the engagement of the pawl 97 with the link 92 ensures that the recess 95 engages the upper edge 96 of the dispensing member 4 as soon as the latter reaches its lowermost position. Thus the member 4 cannot again be displaced upwardly for the time being.

Engagement of the pawl 97 with the step 117 on the link 92 holds the interlock lever 78 in the raised position, and hence the bellows 85 compressed, for as long as the member 4 is held in the upper dispensing position. It is only when the member 4 has reached the lower resting position and the link 92 can pass over the edge 96 at the top of the cam-like surface 115 that the pawl 97 is freed from the step 117 and the interlock lever 78 released. The pawl 97 is freed as a result of limitation of its pivotal movement by a projecting stop 119 which engages the interlock lever 78 as well as providing an abutment for the spring 98.

Return movement of the interlock lever 78 is now produced by the return spring 86 which acts to extend the bellows 85, with the result that the interlock lever 78 moves downwardly and, after a sufficient time has elapsed for the chamber 3 to drain completely, out of engagement with the pin 65. The valve 81 is closed during expansion of the bellows 85. As a result the toggle linkage moves over-centre to the outlet-closed position and during the continued downward movement of the interlock lever 78 the chamber 3 is filled through the feed tube 1 and the position of the link 92 ensures that the dispensing member 4 cannot be raised until the bellows 85 are again extended, the time taken for the bellows to extend fully after the toggle linkage has moved over-centre being sufficient for the chamber 3 to refill.

It will be appreciated that the interlock and associated time delay renders it impossible to interfere with the complete discharge and complete refilling of the measuring chamber 3 at each dispensing operation, and that it is impossible to operate the mechanism so that either short measure is dispensed when the chamber 3 is incompletely filled or excess measure dispensed by holding the inlet valve open. Thus both the operator and the purchaser are protected against careless or dishonest operation.

A counting device 120 is incorporated which is operated through an arm 121 and which registers each time the valve-operating linkage changes over, thus recording the number of dispensing operations.

The valve 81 has an annular valve member 122 which is engageable with a valve seat 123 which also forms the lower abutment for the return spring 86. The aforementioned stem 84 provides the valve stem which has a helical compression spring 124 and between which and the valve member 122 there is a degree of axial lost motion.

I claim:

1. A liquid measure having a measuring chamber, a normally-open inlet valve and a normally-closed outlet valve for the chamber, a dispensing member which is operable to change over the valves and dispense the measured quantity of liquid contained in the chamber, and an interlock mechanism which includes a time delay device and is operative to prevent reverse change-over of the valves after a dispensing operation until an adequate delay has elapsed for the chamber to drain completely and to prevent another operative movement of the dispensing member with attendant change-over of the valves until a further delay has elapsed adequate to allow the chamber to refill, the time delay device being pneumatic in operation.

2. A liquid measure according to claim 1, wherein the time delay device incorporates a bellows which draws in air through a restriction during return movement to the expanded condition.

3. A liquid measure according to claim 2, wherein return movement of the bellows to the expanded condition is spring aided.

4. A liquid measure according to claim 2, wherein the restriction is provided by an adjustable restrictor valve which enables said delay and said further delay to be adjusted.

5. A liquid measure according to claim 1, wherein the inlet and outlet valves are respectively alternatively closable by opposed ends of a common valve member.

6. A liquid measure having a measuring chamber, a normally-open inlet valve and a normally-closed outlet valve for the chamber provided by respective ends of a common valve member, a dispensing member which is operable to change over the valve member and dispense the measured quantity of liquid contained in the chamber, and an interlock mechanism which includes a time delay device and is operative to prevent reverse changeover of the valve member after a dispensing operation until an adequate delay has elapsed for the chamber to drain completely and to prevent another operative movement of the dispensing member with attendant changeover of the valve member until a further delay has elapsed adequate to allow the chamber to refill, the valve member being changed over by a toggle mechanism which employs an over-centre spring and is controlled by the interlock mechanism.

7. A liquid measure according to claim 6, wherein the toggle linkage is spring urged to a normal outlet-valve closed position.

8. A liquid measure according to claim 6, wherein the spring forms an element of the toggle linkage and takes the form of a bowed leaf spring.

9. A liquid measure according to claim 8, wherein the bowed leaf spring interconnects a pivoted valve-operating lever and a swinging link, which link is displaced by an interlock lever movable by the dispensing member.

10. A liquid measure according to claim 6, wherein the toggle linkage is engaged, for change-over purposes, by the upper end of an interlock lever which is movable with a generally upward dispensing movement of the dispensing member.

11. A liquid measure according to claim 10, wherein the interlock lever is movable from its normal position to take up a predetermined amount of clearance before engaging the toggle linkage to change over the latter, the time taken for the interlock lever to move through said clearance on the return movement corresponding to said further time delay.

12. A liquid measure having a measuring chamber, a normally-open inlet valve and a normally-closed outlet valve for the chamber provided by a common valve member, a dispensing member which is manually operable to change over the valve member and dispense the measured quantity of liquid contained in the chamber, a mechanical linkage operatively interconnecting the valve member and the dispensing member, a time delay device which ensures a minimum time delay between two dispensing operations and which is mechanically connected to said mechanical linkage to render the dispensing member inoperative during said minimum time delay.

13. A liquid measure according to claim 12, wherein said time delay includes two components during a first of which return movement of the dispensing member to its normal resting position with attendant reverse change over of the valve member is blocked by an interlock member, and during the second of which a further dispensing movement of the dispensing member from the normal position is prevented by said interlock member.

14. A liquid measure according to claim 12, wherein the time delay device incorporates a bellows which draws in air through a restriction during return movement to the expanded condition.

15. A liquid measure according to claim 14, wherein a hanging link cooperates with the dispensing member when the latter is in the normal position to prevent dispensing movement thereof unless an interlock lever of said mechanical linkage is also in the normal position corresponding to the fully extended condition of the bellows.

16. A liquid measure according to claim 15, wherein the interlock lever or a projection therefrom displaces the hanging link from locking engagement with the dispensing member when both the interlock lever and the dispensing member are in their respective normal positions, the displacement enabling the hanging link to ride upon a cam-like surface on the dispensing member during dispensing movement of the latter.

17. A liquid measure according to claim 15, wherein the interlock lever carries a pivotally mounted pawl and the hanging link is formed with a step in which the pawl locates to hold the interlock lever in an outlet valveopen position for as long as the dispensing member is held in the dispensing position.

18. A liquid measure according to claim 15, wherein the dispensing member is movable generally upwardly from the normal position and the hanging link is pivotally mounted about a fixed point above the dispensing member when the latter is in said normal position, the lower end of the hanging link having a recess which is engageable with a top edge of the dispensing member to provide said locking engagement.

References Cited

UNITED STATES PATENTS

| | | | |
|---|---|---|---|
| 2,313,846 | 3/1943 | Tamminga | 222—70 |
| 3,080,097 | 3/1963 | Schmaus | 222—453 X |
| 3,181,574 | 5/1965 | Lenkey et al. | 222—453 X |

SAMUEL F. COLEMAN, Primary Examiner

U.S. Cl. X.R.

222—442, 477